(12) United States Patent
Sekine

(10) Patent No.: US 7,429,216 B2
(45) Date of Patent: Sep. 30, 2008

(54) VEHICLE STEERING DEVICE

(75) Inventor: Hiroshi Sekine, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 160 days.

(21) Appl. No.: 10/563,831

(22) PCT Filed: May 11, 2004

(86) PCT No.: PCT/JP2004/006607

§ 371 (c)(1),
(2), (4) Date: Jan. 6, 2006

(87) PCT Pub. No.: WO2005/005850

PCT Pub. Date: Jan. 20, 2005

(65) Prior Publication Data

US 2006/0223641 A1    Oct. 5, 2006

(30) Foreign Application Priority Data

Jul. 11, 2003  (JP) ............................. 2003-195986
Jul. 18, 2003  (JP) ............................. 2003-199536

(51) Int. Cl.
*F16D 3/224* (2006.01)
(52) U.S. Cl. ...................... 464/145; 464/906
(58) Field of Classification Search ......... 464/144–146, 464/141, 906, 140, 182; 72/714
See application file for complete search history.

(56) References Cited

U.S. PATENT DOCUMENTS 2,325,460 A * 7/1943 Amberg ...................... 464/144
4,685,897 A * 8/1987 Krude ......................... 464/141

6,488,588 B1 * 12/2002 Kadota et al. ............... 464/145
6,579,187 B2 * 6/2003 Ramey ................... 464/145 X
2003/0083135 A1    5/2003 Yamazaki et al.

FOREIGN PATENT DOCUMENTS

| DE | 43 06 121 A1 | 9/1994 |
|---|---|---|
| GB | 1 288 745 A | 9/1972 |
| JP | 3-25445 Y2 | 6/1991 |
| JP | 7-43494 Y2 | 10/1995 |
| JP | 2000-211541 A | 8/2000 |
| JP | 2000-249157 A | 9/2000 |

(Continued)

OTHER PUBLICATIONS

Universal Joint and Driveshaft Design Manual, Ae-7, Society of Automotive Engineers, Inc., Warrendale, PA, p. 210, TJ 1079.S62 1979.*

*Primary Examiner*—Greg Binda
(74) *Attorney, Agent, or Firm*—Sughrue Mion, PLLC

(57) ABSTRACT

A vehicular steering apparatus, includes an input shaft for transmitting rotation from a steering wheel, an intermediate shaft including an upper intermediate shaft, a lower intermediate shaft and a buffer coupling for coupling the upper intermediate shaft and the lower intermediate shaft, an output shaft for driving a steering mechanism on a side of a vehicle, and universal joints for respectively coupling the input shaft and the upper intermediate shaft as well as the lower intermediate shaft and the output shaft, in which at least one of the universal joints is a universal ball joint.

2 Claims, 13 Drawing Sheets

FOREIGN PATENT DOCUMENTS

| | | |
|---|---|---|
| JP | 2000-257645 A | 9/2000 |
| JP | 2000-266072 A | 9/2000 |
| JP | 2001-199352 A | 7/2001 |
| JP | 2002-144155 A | 4/2002 |
| JP | 2003-56590 A | 2/2003 |
| JP | 2003-056590 A | 2/2003 |
| JP | 2003-130082 A | 5/2003 |

* cited by examiner

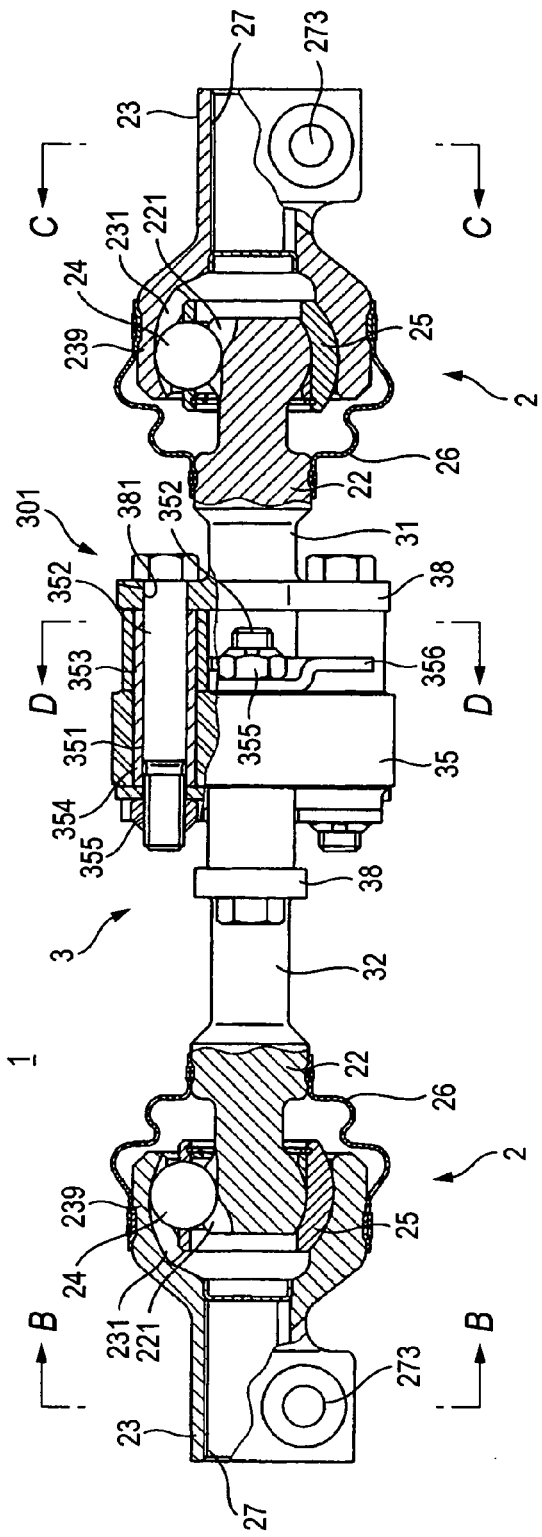
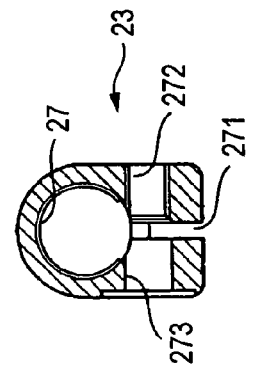
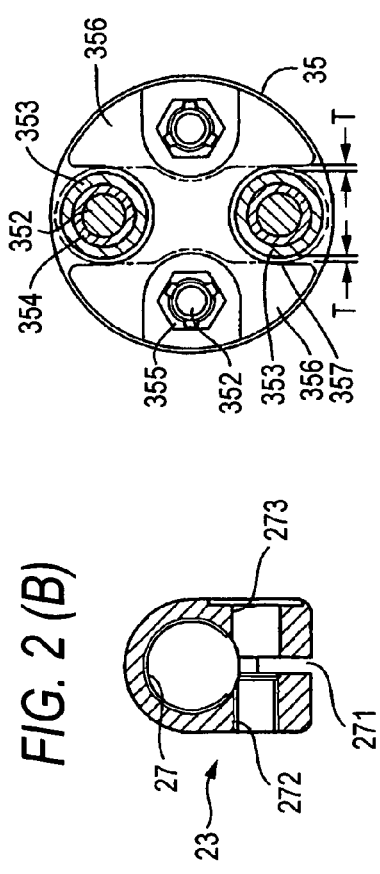
FIG. 2(A)
FIG. 2(C)
FIG. 2(D)
FIG. 2(B)

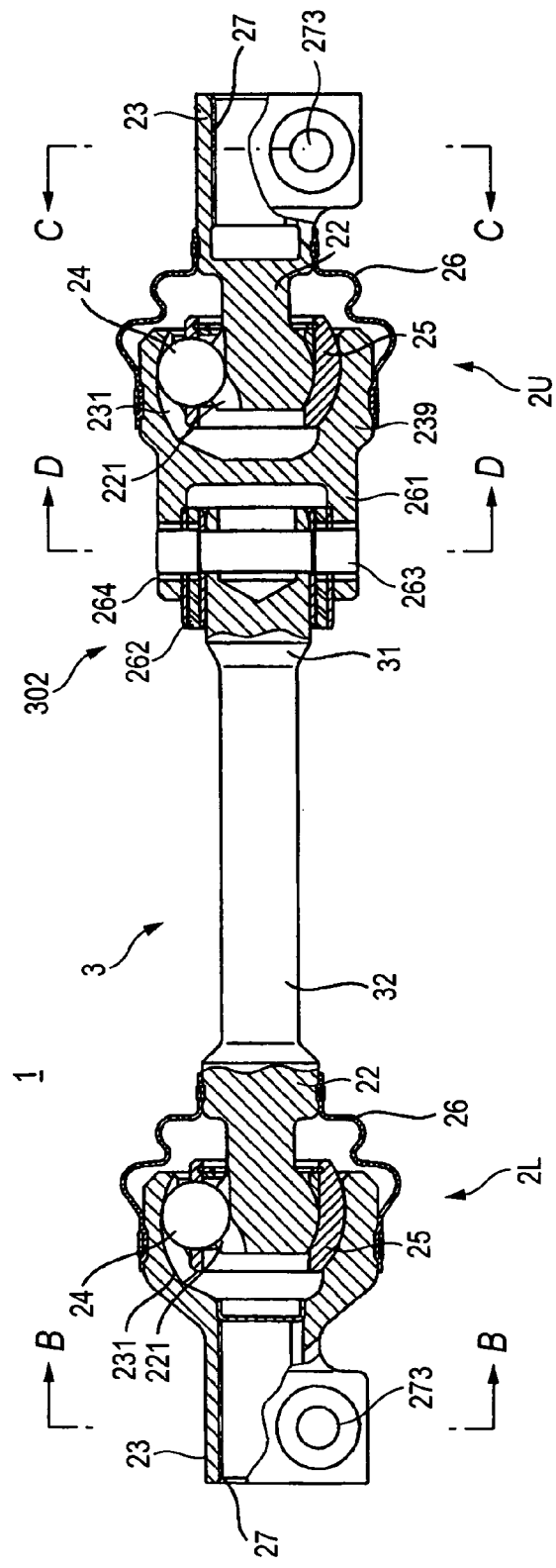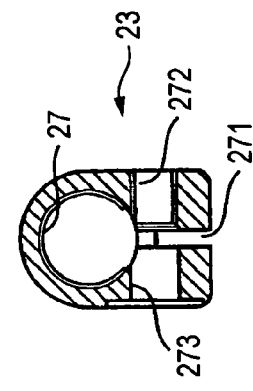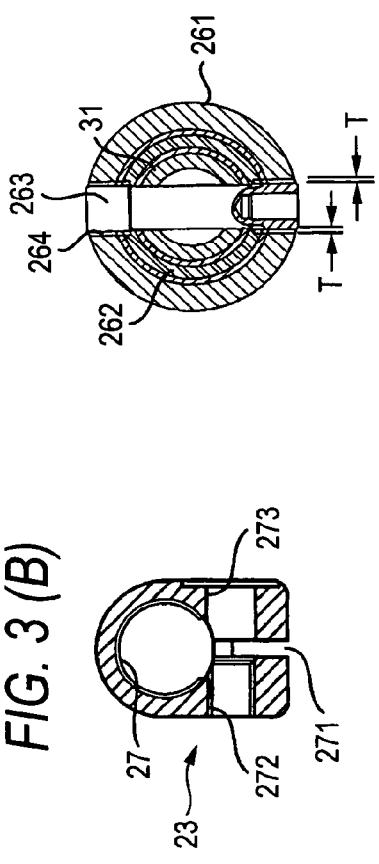

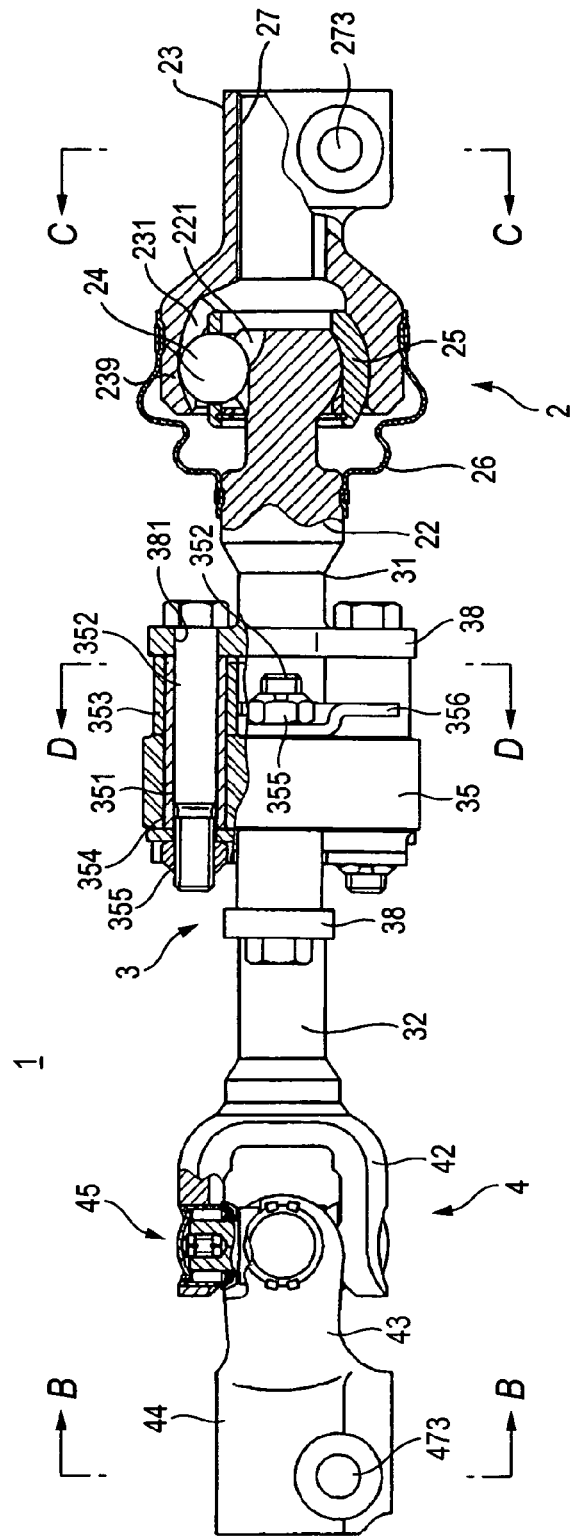
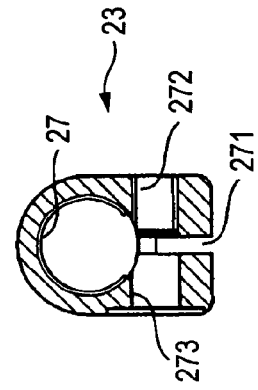
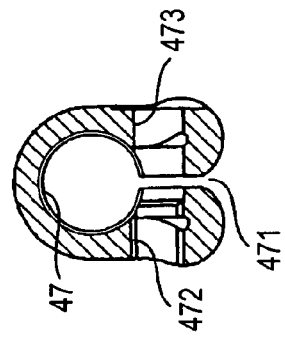
FIG. 4 (A)
FIG. 4 (C)
FIG. 4 (B)

VEHICLE STEERING DEVICE

TECHNICAL FIELD

The present invention relates to a joint apparatus for transmitting rotation between two shafts having different directions, particularly relates to a joint apparatus and a universal ball joint for a vehicular steering.

BACKGROUND ART

A universal joint apparatus is used for transmitting rotation or power between two shafts which are not disposed on a straight line. A cross universal joint referred to as a Cardan joint, a hook joint, a cross joint or the like is constituted by coupling two shafts via a cross member having four shaft portions in a cross-like shape. The two shaft portions disposed on sides opposed to each other are supported by yokes of the respective shafts.

A universal ball joint interposes a torque transmitting ball at guide grooves formed at an inner face of an outer joint member and an outer face of an inner joint member fitted thereto, respectively, to thereby transmit power between two shafts provided with the inner and the outer joint members.

Whereas according to the constant velocity ball universal joint, rotation between two shafts is made an equal velocity even when there is an intersecting angle therebetween, on the other hand, the cross universal joint is provided with a drawback derived from mechanics that rotation between two shafts is not made an equal velocity when there is an intersecting angle therebetween. In order to eliminate the drawback, when the cross universal joint is used as a joint apparatus, in many cases, two sets thereof are used as a pair of combination by interposing an intermediate shaft. In this case, it is necessary to integrate the two sets such that respective intersecting angles thereof are made to be equal to each other and phases in rotational directions of two cross members are set to a predetermined relationship.

According to a steering apparatus of a vehicle, when vibration from a road face is transmitted to a handle (steering wheel), steering feeling is deteriorated. Therefore, vibration from the road face is devised not to be transmitted to the steering wheel by providing a shock absorber. Normally, a rubber joint apparatus interposing vibration isolating rubber between the two shafts is used for such a shock absorber as a countermeasure against vibration. When the rubber joint apparatus is provided at an intermediate shaft of the joint apparatus, a torsional rigidity thereof is comparatively low owing to a structure thereof. Therefore, when the steering wheel is rotated by a strong force, the rubber joint apparatus is significantly twisted. Therefore, the above-described phases in the rotational directions of the two cross members are deviated from each other, equal velocity performance which is to be achieved by combining the cross universal joints is deteriorated. As a result, a variation in a transmission torque is brought about. The operation also deteriorates steering feeling.

Further, since the rubber joint apparatus is assembled with the vibration isolating rubber and other parts, and there are large numbers of related many parts, the apparatus is accompanied by considerably large fabrication errors. Owing to the errors, the equal velocity performance which is to be achieved by combining the cross universal joints in consideration of the phases is deteriorated, which amounts to a variation in the transmission torque and a deterioration in the steering feeling. Although the errors are resolved for the time being by promoting accuracy of the rubber joint apparatus and parts related thereto, or selecting combinations of individual parts to integrate (matching), such a countermeasure is not preferable in view of cost. Although the vibration isolating rubber member is provided with a stopper which is operated against a constant amount or more of torsion, when a stopper angle thereof is reduced in order to promote accuracy, there also poses a problem that it is difficult to achieve a constitution which can be satisfied in view of a vibration isolating function.

(Patent Reference 1)
JP-A-2000-257645
(Patent Reference 2)
JP-UM-B-7-43494
(Patent Reference 3)
JP-UM-B-3-25445

Although when used in a steering apparatus, a female joint member is coupled to an input shaft or an output shaft (for example, intermediate shaft) therefor integrally or by a connecting base member integral with the female joint member, it is ordinary that a male joint member is integrally formed with the input shaft or the output shaft therefor. However, for convenience of design of other part, also a member coupled with the input shaft or the output shaft becomes a male shaft. Although in this case, a coupling for coupling the shafts is needed, when constituted in this way, a rotational diameter of the joint portion is increased. Further, when a shaft length is obliged to set to be short, there is a case in which the coupling cannot be put therebetween. Therefore, there is a case that such attaching method cannot be adopted. Further, in this case, the coupling needs to be prepared separately and therefore, cost is increased by the coupling per se and integration thereof.

Further, the above-described ball guide groove needs to be subjected to highly accurate finish grinding (polishing) since the torque transmitting ball is rolled. However, the ball guide groove on a side of the female joint member is formed at inside of an inner space such that the torque transmitting ball and an outer spherical face joint portion of the male joint member are contained to an inner portion thereof. Further, since the space is formed at an end portion of the input shaft or the output shaft which is integrally solid and therefore, the space is necessarily provided with a bottom portion. That is, a groove having an inner wall face of a bottomed hole needs to be accurately ground. It is not inherently easy to grind the inner wall face of the bottomed hole, further, the groove at inside thereof needs to be accurately ground and therefore, it is a current state that time and cost are taken in grinding the ball guide groove on the side of the female joint member.

{Patent Reference 4}
JP-A-2002-114155

The present invention is an invention which has been carried out in view of the above-described problem and it is a first problem thereof to provide a joint apparatus for a vehicular steering apparatus in which a variation in a steering torque is inconsiderable, a vibration isolating function is excellent and fabrication cost is inexpensive.

Further, the present invention is an invention which has been carried out in view of the above-described problem and it is a second problem thereof to provide a universal ball joint for a vehicular steering apparatus capable of being coupled with a counterpart of coupling without separately preparing a coupling even when the counterpart of coupling is a shaft (male shaft), constituting a coupling portion on a side of a female joint member and a space of an inner spherical face joint portion by a through hole, and capable of easily grinding a ball guide groove. Further, it is a third problem thereof to provide a universal ball joint at inexpensive cost thereby.

DISCLOSURE OF THE INVENTION

The first problem is resolved by the following means. That is, resolving means of a first aspect of the present invention is a vehicular steering apparatus, a joint apparatus for a vehicular steering apparatus, comprising an input shaft for transmitting rotation from a steering wheel, an intermediate shaft including an upper intermediate shaft, a lower intermediate shaft and a buffer coupling for coupling the upper intermediate shaft and the lower intermediate shaft, an output shaft for driving a steering mechanism on a side of a vehicle, and universal joints for respectively coupling the input shaft and the upper intermediate shaft as well as the lower intermediate shaft and the output shaft, characterized in that at least one of the universal joints is a constant velocity ball universal joint.

According to resoling means of a second aspect of the present invention, in the joint apparatus for a vehicular steering apparatus of the first aspect of the present invention, both of the universal joints are the constant velocity ball universal joints.

According to resolving means of a third aspect of the present invention, in the joint apparatus for a vehicular steering apparatus of the first aspect of the present invention, one of the universal joints is the constant velocity ball universal joint and another is a cross universal joint.

According to resolving means of a fourth aspect of the present invention, in the joint apparatus for the vehicular steering apparatus of the first aspect through the third aspect of the present invention, an intersecting angle of the constant velocity ball universal joint is selected to be larger than an intersecting angle of the cross universal joint.

According to resolving means of a fifth aspect of the present invention, in the joint apparatus for the vehicular steering apparatus of the first aspect through the fourth aspect of the present invention, the buffer coupling is a rubber coupling using rubber as a buffer material.

The second and third problems are resolved by the following means. That is, resolving means of a sixth aspect of the present invention is a vehicular steering apparatus comprising a male joint member including a first connecting base portion constituting a cylindrical shape and an outer spherical face joint portion provided on an axis line of the first connecting base portion and having a spherical outer face, a female joint member including a second connecting base portion constituting a cylindrical shape and an inner spherical face joint portion provided on an axis line of the second connecting base portion and having a spherical space fitted with the spherical outer face, an outer ball guide groove formed at the spherical outer face of the outer spherical face joint portion, an inner ball guide groove formed at an inner face of the spherical space of the inner spherical face joint portion, a torque transmitting ball guided by the outer ball guide groove and the inner ball guide groove, and a ball retainer for retaining the torque transmitting ball, characterized in that each of the first connecting base portion and the second connecting base portion includes at least one slit reaching an inner portion of a cylinder of each thereof.

According to resolving means of a seventh aspect of the present invention, in the vehicular steering apparatus of the sixth aspect of the present invention, flanges constituting a pair for fastening are respectively formed on both sides of the slit of each of the first connecting base portion and the second connecting base portion, wherein each pair of the flange is formed coaxially with fastening holes.

According to resolving means of an eighth aspect of the present invention, in the vehicular steering apparatus of the sixth or the seventh aspect of the present invention, a female serration is formed at an inner face of the cylinder of each of the first connecting base portion and the second connecting base portion.

According to resolving means of a ninth aspect of the present invention, in the vehicular steering apparatus of any of the sixth through the eighth aspects of the present invention, an interval between a cylindrical hole of the second connecting base portion and the inner spherical face joint portion is formed with a through hole penetrated coaxially.

According to resolving means of a tenth aspect of the present invention, in the vehicular steering apparatus of the ninth aspect of the present invention, the through hole is attached with a dust preventing cap for preventing dust and dirt from invading inside of the spherical space by passing the cylindrical hole between the cylindrical hole and the spherical space.

According to resolving means of an eleventh aspect of the present invention, in the vehicular steering apparatus of any one of the sixth through the tenth aspects of the present invention, an interval between the male joint member and the female joint member is provided with a dust preventing boot in a cylindrical shape having a flexible fold for preventing dust and dirt from invading inside of the spherical space.

BRIEF DESCRIPTION OF THE DRAWINGS

FIG. 2 illustrates explanatory views of a joint apparatus 1 according to a first embodiment, FIG. 2(A) is a partially sectional view, FIG. 2(B) is a sectional view taken along a line B-B, FIG. 2(C) is a sectional view taken along a line C-C, and FIG. 2(D) is a sectional view taken along a line D-D.

FIG. 3 illustrates explanatory views of the joint apparatus 1 according to a second embodiment, FIG. 3(A) is a partially sectional view, FIG. 3(B) is a sectional view taken along a line B-B, FIG. 3(C) is a sectional view taken along a line C-C, and FIG. 3(D) is a sectional view taken along a line D-D.

FIG. 4 illustrates explanatory views of the joint apparatus 1 according to a third embodiment, FIG. 4(A) is a partially sectional view, FIG. 4(B) is a sectional view taken along a line B-B, and FIG. 4(C) is a sectional view taken along a line C-C.

Figure 1:
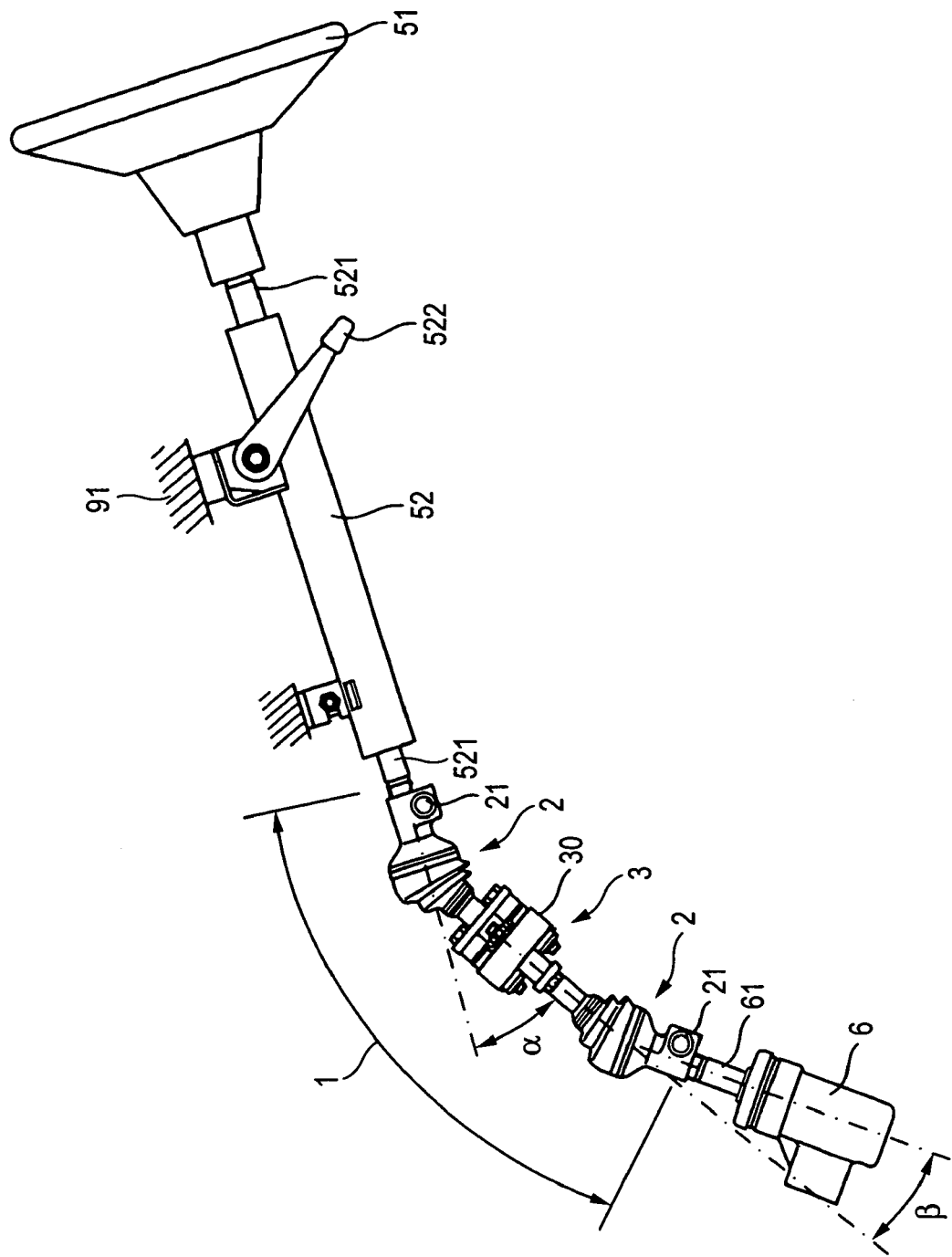
FIG. 1 is an explanatory view showing a total of a steering mechanism of an automobile to which the present invention is applied.

Further, in notations in the drawings, numeral 1 designates joint apparatus, notations 2, 2L, 2U, 2' designate universal ball joints, numerals 21, 21' designate fastening bolts, numeral 22 designates an inner joint portion, numeral 221 designates a ball guide groove, numeral 23 designates an outer joint member, numeral 231 designates a ball guide groove, numeral 239 designates an outer joint portion, numeral 24 designates a torque transmitting ball, numeral 25 designates a ball retainer, numeral 26 designates a boot, numeral 261 designates a coupling cylinder, numeral 262 designates a rubber bush, numeral 263 designates a stopper pin, numeral 264 designates a lateral hole, numeral 27 designates a shaft hole, numeral 271 designates a slotting hole, numeral 272 designates a bolt hole, numeral 273 designates a clearance hole, numeral 3 designates an intermediate shaft, numeral 30 designates a buffer coupling, numeral 301 designates a rubber coupling, numeral 302 designates a rubber coupling, numeral 31 designates an upper intermediate shaft, numeral 32 designates a lower intermediate shaft, numeral 35 designates a vibration isolating rubber member, numeral 351 designates a bolt hole, numeral 352 designates a bolt, numeral 353 designates a spacer, numeral 354 designates a sleeve, numeral 355 designates a nut, numeral 356 designates a stopper, numeral 357 designates a contact side, numeral 38 designates a flange, numeral 381 designates a bolt hole, numeral 4 designates a cross universal joint, numeral 42 designates a first yoke arm pair, numeral 43 designates a second yoke arm pair, numeral 432 designates a lower intermediate shaft, numeral 44 designates an output yoke member, numeral 45 designates across shaft member, numeral 47 designates a shaft hole, numeral 472 designates a bolt hole, numeral 473 designates a clearance hole, numeral 51 designates a steering wheel, numeral 52 designates a steering column, numeral 521 designates a wheel shaft, numeral 522 designates an adjusting lever, numeral 6 designates a vehicle body side steering mechanism, numeral 61 designates an input shaft, notation T designates a clearance, numeral 7 designates a male joint member, numeral 71 designates a first connecting base portion, numeral 711 designates a slit, numeral 712 designates a flange, numeral 713 designates a bolt hole, numeral 714 designates a clearance hole, numeral 715 designates a female serration, numeral 72 designates an outer spherical face joint portion, numeral 721 designates an outer ball guide groove, numeral 73 designates a welded portion, numeral 8 designates a female joint member, numeral 81 designates a second connecting base portion, numeral 811 designates a slit, numeral 812 designates a flange, numeral 813 designates a bolt hole, numeral 814 designates a clearance hole, numeral 815 designates a female serration, numeral 816 designates a cylindrical hole, numeral 82 designates an inner spherical face joint portion, numeral 821 designates an inner ball guide groove, numeral 823 designates a spherical space, numeral 881 designates a torque transmitting ball, numeral 882 designates a ball retainer, numeral 883 designates a hole, numeral 91 designates a vehicle main body, numeral 95 designates a dust preventing boot, and numeral 95 designates a dust preventing cap.

BEST MODE FOR CARRYING OUT THE INVENTION

First Embodiment

FIG. 1 is an explanatory view showing a total of a steering mechanism of an automobile to which the present invention is applied. The drawing shows a portion upward from the vehicle side steering mechanism 6. The steering column 52 is fixed to the vehicle main body 91 such that inclination thereof is adjustable by the adjusting lever 522. The wheel shaft 521 is rotatably supported by the steering column 52 to penetrate inside thereof, and the steering wheel 51 is fixed to an upper end of the wheel shaft 521. The joint apparatus 1 is coupled to other end, that is, a lower end side of the steering column 52.

The joint apparatus 1 is provided with the constant velocity ball universal joints 2, 2 on an upper side and a lower side thereof and the intermediate shaft 3 coupling the couplings at a middle thereof. The respective universal ball joints 2 are respectively coupled to the wheel shaft 521 and the input shaft 61 of the vehicle body side steering mechanism 6 by the fastening bolts 21. Intersecting angles α and β are intersecting angles of the constant velocity ball universal joints 2 and angles which are respectively made by center axis lines of the wheel shaft 521 and the input shaft 61 relative to a center axis line of the intermediate shaft 3. The intermediate shaft 3 is provided with the buffer coupling 30.

FIG. 2 illustrates explanatory views of the joint apparatus 1 according to the first embodiment, FIG. 2(A) is a partially sectional view, FIG. 2(B) is a sectional view taken along a line B-B, FIG. 2(C) is a sectional view taken along a line C-C, and FIG. 2(D) is a sectional taken along a line D-D.

The joint apparatus 1 is constituted as follows. Both ends of the intermediate shaft 3 are respectively formed with the inner side joint portions 22 constituting portions of the constant velocity ball universal joints 2.

A vicinity of a front end of the inner joint portion 22 of the constant velocity ball universal joint 2 is formed in a spherical shape, and the ball guide groove 221 is formed with a spherical face thereof. Meanwhile, the outer joint member 23 is provided with the outer joint portion 239 having a recess portion in a spherical shape, and the ball guide groove 231 is formed the recess portion. Both of the two ball guide grooves 221, 231 are extended a long an axial direction of the intermediate shaft 3 and the outer joint member 23, and the inner joint portion 22 and the outer joint member 23 are coupled to each other with regard to rotation by fitting the common torque transmitting ball 24 rollably into the grooves.

The ball retainer 25 having an inner face complementally with the spherical face of the inner joint portion 22 is made to be rotatable around a center of the spherical face while holding the torque transmitting ball 24. The vicinity of a boundary of the inner joint portion 22 and the outer joint portion 239 is covered by the boot 26 constituting a flexible cover to prevent dust and dirt from invading from outside.

The outer joint members 23 include the shaft holes 27 to be respectively fixed to the wheel shaft 521 and the input shaft 61 of the vehicle body side steering mechanism 6 and the shaft holes 27 are provided with the slotting holes 271. The outer joint members 23 are respectively fixed to the wheel shaft 521 and the input shaft 61 by screwing the fastening bolts 21 to the clearance holes 273 and the bolt holes 272 provided on both sides of the slotting holes 271. Operational efficiency can be promoted by providing the clearance holes 273 on the same side of the joint apparatus 1 as shown by FIG. 2 such that operation of fastening the fastening bolts 21 can be carried out from the same direction in integrating to the vehicle body.

The intermediate shaft 3 according to the first embodiment is split off into the upper intermediate shaft 31 and the lower intermediate shaft 32. The rubber coupling 301 shown below is provided as the buffer coupling 30 therebetween. That is, end portions of the upper intermediate shaft 31 and the lower intermediate shaft 32 opposed to each other are respectively formed with the flanges 38 in a shape of an arm. The two bolt holes 381 are respectively formed at positions of the respective flanges 38 the same as each other. The vibration isolating rubber member 35 in a shape of a circular plate is provided with the four bolt holes 351 in cross directions. The two flanges 38 are arranged by shifting phases of the bolt holes 381 of the two flanges 38 alternately by 90 degrees to be opposed to each other by interposing the vibration isolating rubber member 35. Thereby, the four bolt holes 351 of the vibration isolating rubber member 35 and the bolt holes 381 of the respective flanges are aligned on straight lines and the four bolts 352 are respectively passed therethrough to fix.

A further detailed explanation will be given of the above-described structure as follows. The sleeve 354 is fitted to the bolt hole 351 of the vibration isolating rubber member 35 and the spacer 353 in a cylindrical shape is fitted further to a portion of the sleeve 354 projected from the vibration isolating rubber member 35. The bolt 352 is inserted into the sleeve 354 and is fastened to fix by the nut 355 along with the stopper 356, mentioned later. By such a structure, the upper intermediate shaft 31 and the lower intermediate shaft 32 are coupled by interposing the vibration isolating rubber member 35, metals are not brought into contact with each other and therefore, vibration of the lower intermediate shaft 32 is absorbed by the vibration isolating rubber member 35 to be made difficult to be transmitted to the upper intermediate shaft 31.

The above-described stoppers 356 are respectively constituted by a shape of a half moon and are fixed at center portions thereof by the above-described bolts 352. Clearances T are respectively formed between the contact sides 357 in correspondence with chords of the half moons of the stopper 356 and the spacers 353. By providing the clearances T, when a small force is exerted between the upper intermediate shaft 31 and the lower intermediate shaft 32, for example, when vibration is transmitted from the lower intermediate shaft 32, the vibration isolating rubber member 35 is permitted to deform in intervals of the clearances T to operate to absorb vibration. Further, when a large torque is applied, the stopper 356 is brought into contact with the spacer 353 and therefore, a steering torque is firmly transmitted from the upper intermediate shaft 31 to the lower intermediate shaft 432 to thereby enable to carry out steering wheel operation safely.

As described above, the joint apparatus for the vehicular steering apparatus according to the first embodiment uses two of the constant velocity ball universal joints and therefore, when the couplings and the intermediate shafts are integrated, it is not necessary to carry out complicated phase matching and promote accuracy therefor and cost can be reduced. Further, according to the joint apparatus, although the rubber coupling is used, the universal joint is the constant velocity ball universal joint and therefore, a variation in the torque as in using the cross universal joint is not produced and therefore, a feeling of operating the steering wheel is not deteriorated by the variation in the torque. Furthermore, vibration from the vehicle body side is absorbed by the rubber coupling and therefore, operational feeling can be maintained excellently. Further, even when a large torque is applied by steering wheel operation at emergency, the stopper is brought into contact with the spacer and the torque can be transmitted to the lower intermediate shaft and therefore, the safety of the steering apparatus can be promoted also in this respect.

Second Embodiment

Although the joint apparatus 1 according to the second embodiment is provided with the constant velocity ball universal joints 2L, 2U on the upper side and on the lower side and the intermediate shaft 3 connecting the couplings at the middle similar to the first embodiment, a main difference therebetween resides in that with regard to the constant velocity ball universal joint 2U on one side, the relationship between the inner joint portion 22 and the outer joint portion 239 of the first embodiment is reversed and the structure of the buffer coupling 30 differs therefrom.

With regard to the first aspect, simply the direction differs and therefore, in explaining the structure of the constant velocity ball universal joint per se, the explanation of the first embodiment is referred and in the following, an explanation will be given only of the buffer coupling having the different structure. FIG. 3 illustrates explanatory views of the joint apparatus 1 according to the second embodiment, FIG. 3(A) is a partially section view, FIG. 3(B) is a sectional view taken along a line B-B, FIG. 3(C) is a sectional view taken along a line C-C, and FIG. 3(D) is a sectional view taken along a line D-D.

As shown by the drawings, one side (left side of FIG. 3) of the intermediate shaft 3 is formed with the inner joint portion 22 constituting a portion of the constant velocity ball universal joint 2L similar to that of the first embodiment, and other side (right side of FIG. 3) is formed with the outer joint portion 239. Aside of the outer joint portion 239 opposed to the recess portion in the spherical shape is provided with the rubber coupling 302 constituting the buffer coupling 30 having a constitution different from that of the first embodiment between the side of the outer joint portion 239 opposed to the recess portion in the spherical shape and the intermediate shaft 3. The constitution of the rubber coupling 302 is as follows.

An inner side of the coupling cylinder 261 integrally formed with the outer joint portion 239 is press-fitted with the rubber bush 262 in a cylindrical shape and an inner side of the rubber bush 262 is press-fitted with the upper intermediate shaft 31. The upper intermediate shaft 31 is fixed with the stopper pin 263, and the stopper pin 263 is projected into the lateral hole 264 provided at the coupling shaft 261. A clearance T is provided between an inner face of the lateral hole 264 and an outer face of the projected portion of the stopper pin 263.

The outer joint member 23 and the intermediate shaft 3 are coupled via the rubber bush 262 and therefore, when vibration is transmitted from the intermediate shaft 3, the rubber bush 262 is permitted to deform at an interval of the clearance T to operate to absorb vibration. Further, when a large torque is applied, the stopper pin 263 is brought into contact with the inner face of the lateral hole 262 and therefore, the steering torque is firmly transmitted to enable to carry out steering wheel operation safely.

As described above, similar to the first embodiment, the joint apparatus for the vehicular steering apparatus according to the second embodiment uses the two constant velocity ball universal joints and therefore, in integrating the couplings and the intermediate shafts, it is not necessary to carry out complicated phase matching or promote accuracy therefor and the cost can be reduced. Further, according to the joint apparatus, although the rubber coupling is used, the universal joint is the constant velocity ball universal joint and therefore, the variation in the torque as in using the cross universal joint is not brought about and therefore, the feeling of operating the steering wheel is not deteriorated by the variation in the torque. Furthermore, vibration from the vehicle body side is absorbed by the rubber coupling and therefore, the operational feeling can excellently be maintained. Further, even when a large torque is applied by steering wheel operation at emergency, the torque can be transmitted by bringing the stopper pin into contact with the inner face of the lateral hole and therefore, safety of the steering apparatus can be promoted also in this respect.

Third Embodiment

According to a third embodiment, one of the constant velocity ball universal joints according to the first embodiment is substituted for a cross universal joint. With regard to the constant velocity ball universal joint 2 and the buffer coupling 30 (rubber coupling 301), the explanation of the first embodiment will be referred and a simple explanation will be given only of a portion of the cross universal joint in reference to FIG. 4. The output yoke member 44 of the cross universal joint 4 is provided with the shaft hole 47 for fixing to the input shaft 61 of the vehicle body side steering mechanism 6 and the shaft hole 47 is provided with the slotting hole 471. The output yoke member 44 is fixed to the input shaft 61 by screwing the fastening bolt 21 to the clearance hole 473 and the bolt hole 472 formed on the both sides of the slotting hole 471. The output yoke member 44 is further formed with the second yoke arm pair 43 comprising a pair of arms.

The cross shaft member 45 is provided with four pieces of shaft portions extended in a cross-like shape and shaft portions on sides opposed to each other are respectively supported axially by the first yoke arm pair 42 and the second yoke arm pair 43. The intermediate shaft 3 and the output yoke member 44 are coupled by interposing the cross shaft member 45 to transmit rotation.

As has already been explained, although velocities of the two shafts coupled by the cross universal joint 4 on one side are not equal and therefore, also the transmitted torque is varied, by assigning a large intersecting angle a to the other side of the constant velocity ball universal joint 2, the intersecting angle at the cross universal joint 4 can be reduced.

Therefore, the variation in the torque of the joint apparatus 1 can be reduced, not only an adverse influence can substantially be prevented from being effected on the steering feeling but also the steering feeling can be prevented from being deteriorated by absorbing vibration, since the buffer coupling 30 of the rubber coupling 301 or the like is provided.

As described above, according to the joint apparatus for the vehicular steering apparatus of the third embodiment, the large intersecting angle is assigned to the constant velocity ball universal joint and therefore, the variation in the torque produced at the cross universal joint can be reduced and cost of a total of the joint apparatus can be reduced by using the inexpensive cross universal joint on one side. Further, also in integrating, it is not necessary to carry out complicated phase matching and to promote accuracy therefor, and therefore, the cost can be reduced also in this respect.

Fourth Embodiment

Figure 5:
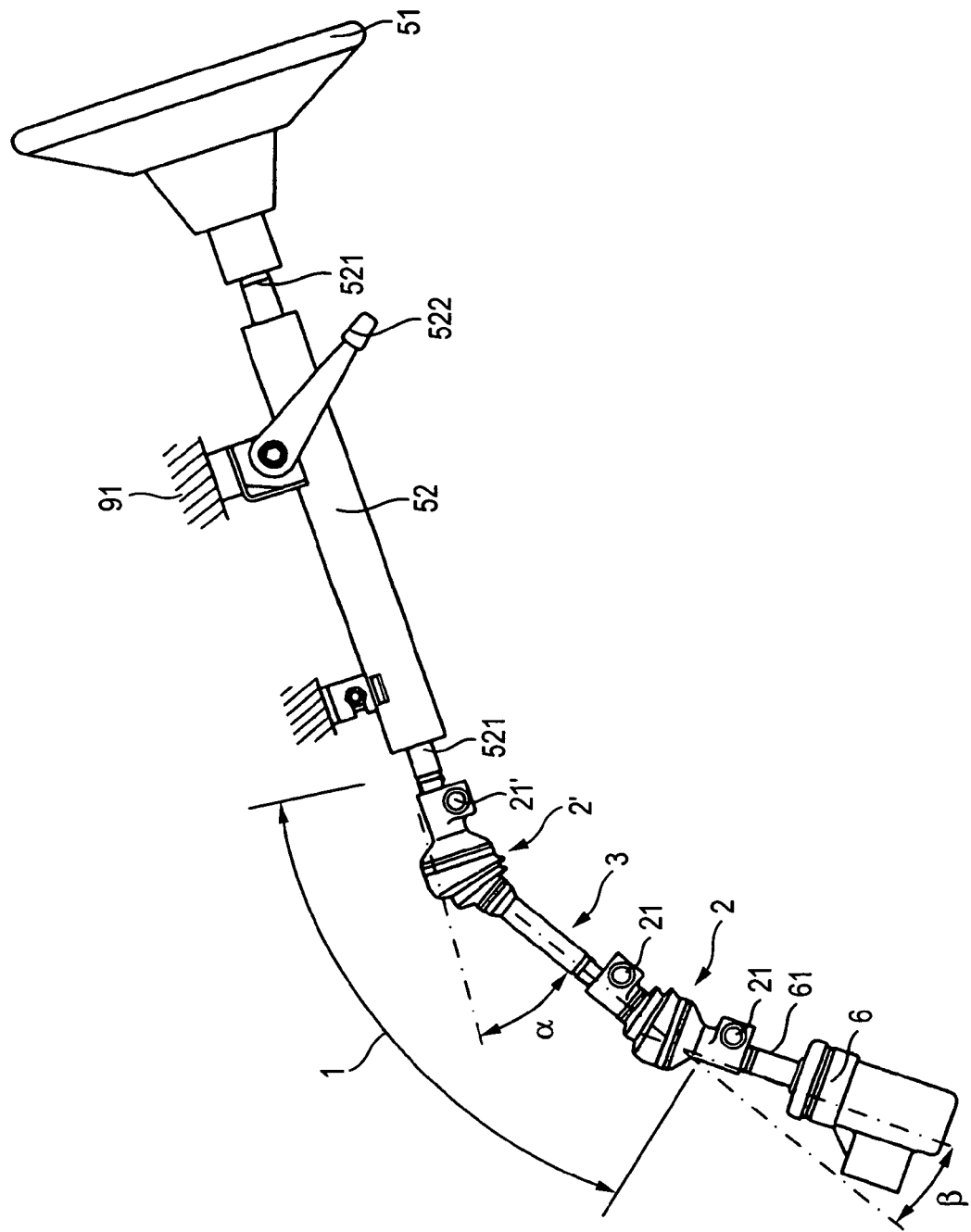
FIG. 5 is an explanatory view showing a total of a steering mechanism of an automobile to which a constant velocity ball universal joint (fourth embodiment) of the present invention is applied.

FIG. 5 is an explanatory view showing a total of a steering mechanism of an automobile to which a universal ball joint (fourth embodiment) of the present invention is applied. The drawing shows a portion upward from the vehicle body side steering mechanism 6. The vehicle main body 91 is fixed with the steering column 52 such that inclination thereof is adjustable by the adjusting lever 522. The wheel shaft 521 is rotatably supported by the steering column 52 to penetrate inside thereof, and the steering wheel 51 is fixed to an upper portion of the wheel shaft 521. The joint apparatus 1 is coupled to other end, that is, the lower end side of the steering column 52.

The joint apparatus 1 is provided with the constant velocity ball universal joint 2 on the lower side, the constant velocity ball universal joint 2' on the upper side and the intermediate shaft 3 connecting the joints at the middle, and the intermediate shaft 3 is integrally formed with the outer spherical face joint portion of the constant velocity ball universal joint 2'.

The respective constant velocity ball universal joints 2, 2' are respectively coupled to the wheel shaft 521, the intermediate shaft 3 and the input shaft 61 of the vehicle body side steering mechanism 6. The intersecting angles α and β are intersecting angles of the constant velocity ball universal joints 2, and are angles made by center axis lines of the wheel shaft 521 and the input shaft 61 relative to the center axis line of the intermediate shaft 3. According to the example, the object of the present invention is shown as the constant velocity ball universal joint 2 on the lower side and an explanation will be given thereof as follows.

Figure 6:
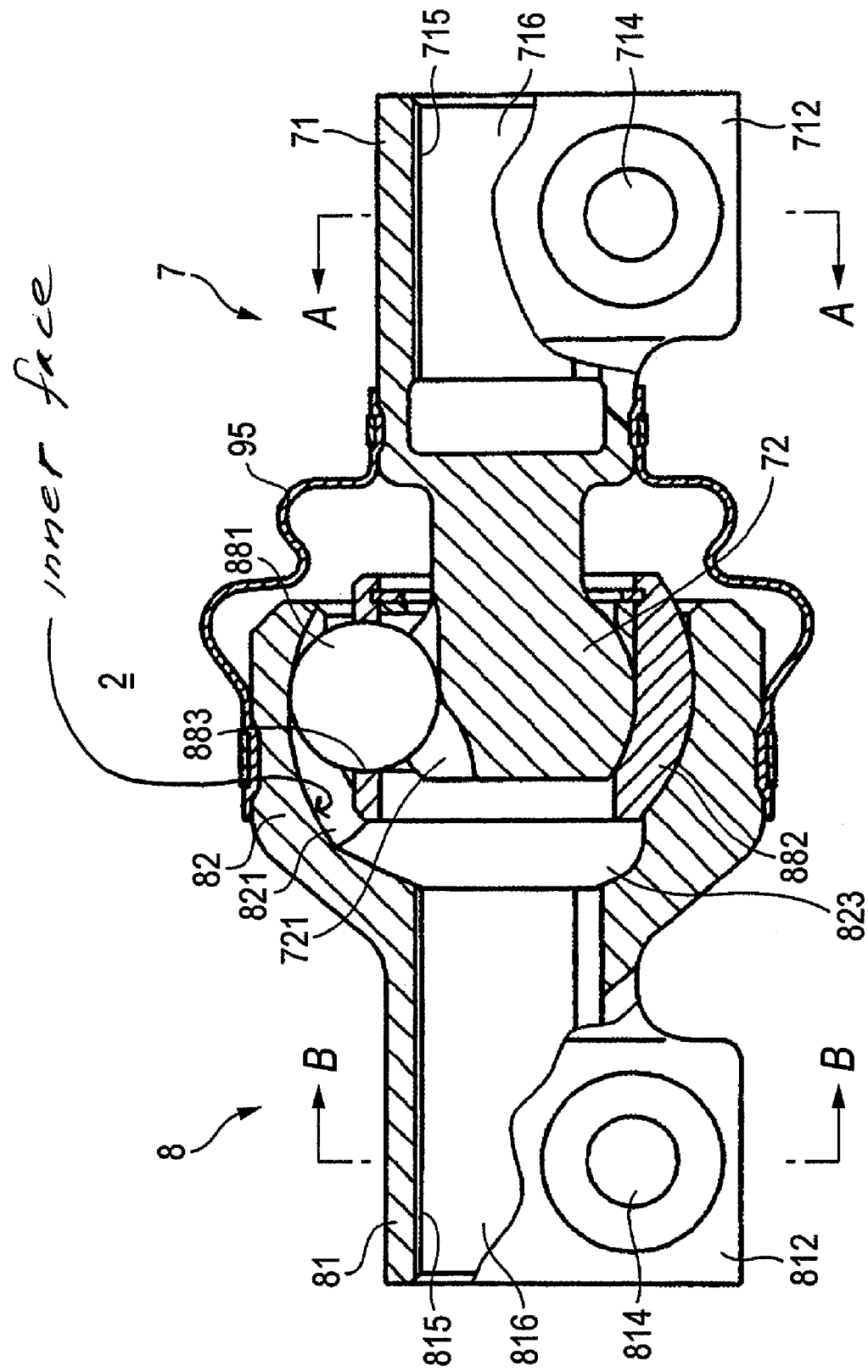
FIG. 6 is a front sectional view of a universal ball joint 2 according to the fourth embodiment.
Figure 7:
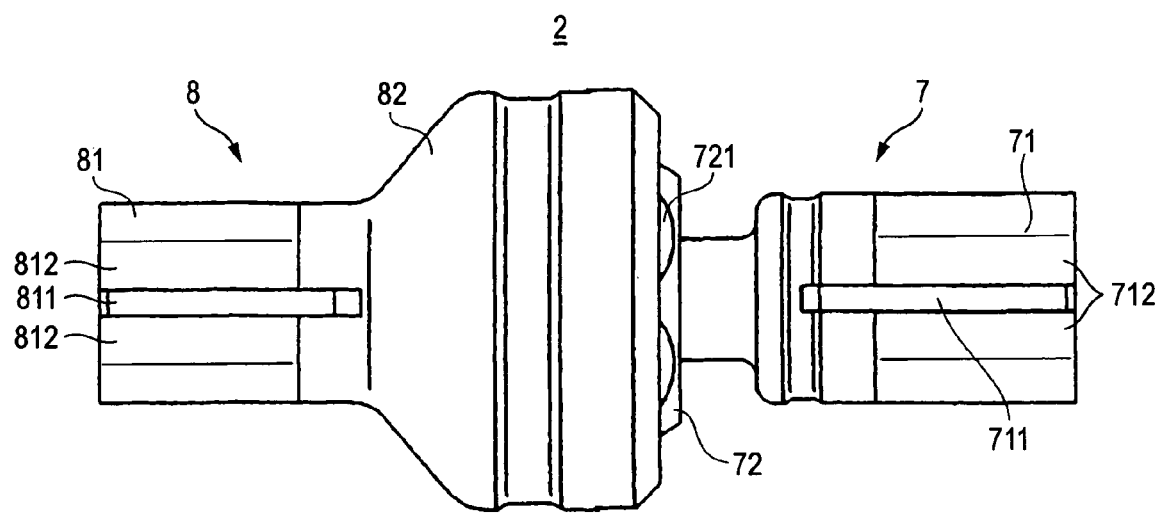
FIG. 7 is a lower side view of the constant velocity ball universal joint 2 according to the fourth embodiment.
Figure 8:
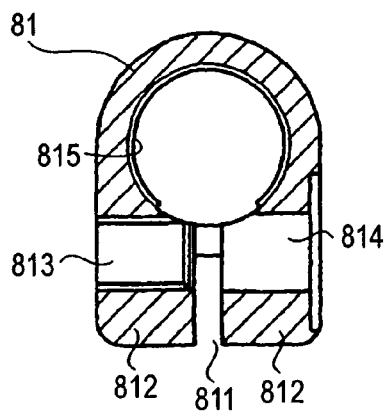
FIG. 8(A) is a sectional view taken along a line A-A of FIG. 6.
FIG. 8(B) is a sectional view taken along a line B-B of the same.
Figure 8:
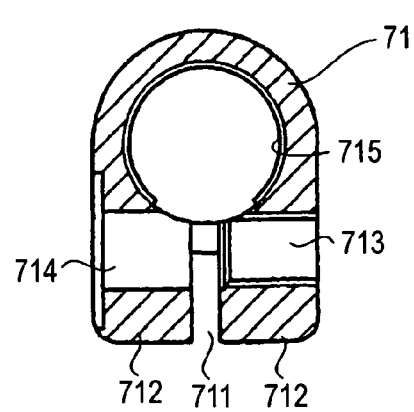

FIG. 6 is a front sectional view of the constant velocity ball universal joint 2 according to the fourth embodiment, FIG. 7 is a lower side view, FIG. 8(A) is a sectional view taken along a line A-A of FIG. 6, and FIG. 8(B) is a sectional view taken along a line B-B of the same.

The male joint member 7 is provided with the first connecting base portion 71 constituting a cylindrical shape, and the outer spherical face joint portion 72 provided on an axis line of the first connecting base portion 71 and having a spherical outer face. Further, the female joint member 8 is provided with the second connecting base portion 81 constituting a cylindrical shape, and the inner spherical face joint portion 82 provided on an axis line of the second connecting base portion 81 and having the spherical space 823 fitted with the spherical outer face.

The spherical outer face of the outer spherical face joint portion 72 is formed with the outer ball guide groove 721 and an inner face of the spherical space 823 of the inner spherical face joint portion 82 is formed with the inner ball guide groove 821, respectively. The torque transmitting ball 881 is fitted to the outer ball guide groove 721 and the inner ball guide groove 821, and guided by the guide grooves. Rotation can be transmitted between the male joint member 7 and the female joint member 8 by three members of the outer ball guide groove 721, the inner ball guide groove 821 and the torque transmitting ball 881, and even when directions of the axis lines of the male joint member 7 and the female joint member 8 differ from each other, a ratio of rotation at this occasion can be maintained constant.

The ball retainer 882 is fitted to the spherical space 823 from an inner side thereof, further, fitted to the spherical outer face of the outer spherical face joint portion 72 from an outer side thereof, the torque transmitting ball 881 is held at inside of the hole 883 provided at the ball retainer 882 to thereby prevent the torque transmitting ball 881 from being detached from the respective guide grooves.

The first connecting base portion 71 and the second connecting base portion 81 are provided with the slits 711, 811 having at least one width of 1.5 through 6 mm, preferably, 2 through 4 mm reaching insides of the respective circular cylinders, and by fastening intervals of the slits, the constant velocity ball universal joint 2 is coupled to male shafts (the input shaft to the constant velocity ball universal joint 2 and the output shaft therefrom) respectively disposed at outside thereof.

The fastening structure is as follows. That is, both sides of the slits 711, 811 of the first connecting base portion 71 and the second connecting base portion 81 are respectively formed with the flanges 712, 812 constituting pairs for fastening, and the respective pairs of the flanges 712, 812 are coaxially formed with the bolt holes 713, 813 on one side and the clearance holes 714, 814 on other side. The bolt hole is M8×1.25 or M10×1.2 of JIS. The fastening bolts are passed from sides of the clearance holes 714, 814 and screwed to the bolt holes 713, 813. By fastening the fastening bolts 21, the intervals of the slits 711, 811 are narrowed and therefore, a coupling relationship is produced between the couplings and the male shafts (not illustrated). Although the coupling may be produced by a friction force, in order to make the coupling more solid, the female serrations 715, 815 are formed at inner faces of cylinders of the first connecting base portion 71 and the second connecting base portion 81 to be geometrically engaged with male serrations of the male shafts. Further, in place of the serrations, also coupling by geometrical constraint by shapes of a spline, an elliptical shape, a polygonal shape or the like can also be adopted. Further, both of the fastening holes may be constituted by a clearance hole to be fastened by a bolt and a nut.

Further, the bolt holes 713, 813, and the clearance holes 714, 814 are formed substantially in the same directions, thereby, directions of inserting the bolts 21 become substantially the same, and in integrating to a vehicle, integrating operation is facilitated. When dust and dirt invades relative movement portions of the outer ball guide groove 721, the inner ball guide groove 821 and the torque transmitting ball 881, not only wear is accelerated but by biting dust and dirt, a very small variation in the torque (rattling feeling) is brought about and therefore, the steering feeling is deteriorated. In order to prevent dust and dirt from invading inside of the spherical space 823 in this way, the cylindrical dust preventing boot 95 having flexible folds and made of rubber or resin is provided between the male joint member 7 and the female joint member 8 to cover the portion.

The cylindrical hole 816 of the second connecting base portion 81 and the spherical space 823 of the inner spherical face joint portion 82 constitute one continuation to thereby form a through hole penetrated coaxially. The ball guide grooves 821, 721 need to be subjected to highly accurate finishing grinding (polishing) to roll the torque transmitting ball. However, the inner ball guide groove 821 on the side of the female joint member 8 is formed at inside of the inner space (spherical space 823) to contain the torque transmitting ball 881 and the outer spherical face joint portion 72 of the male joint member 7 at inside thereof. In the background art, the spherical space 823 is bottomed (that is, not penetrated) and therefore, it is very difficult to grind the inner ball guide groove 821 while supplying a grinding solution from one side in the narrow space and simultaneously putting a grind stone there into and therefore, it is a current state that time and cost are taken in grinding the inner ball guide groove 821 on the side of the female joint member 8.

According to the constant velocity ball universal joint of the present invention, the through hole is formed by the cylindrical hole 816 and the spherical space 823 and therefore, access can be made to the portion to be ground from both sides thereof and therefore, the above-described difficulty is considerably alleviated and time and cost of grinding can be reduced. Further, by penetrating in this way, in working the female serration 815, efficient broaching can be adopted and therefore, the cost can be reduced. Cold forging, hot forging and machining are adopted for the male joint member 7 and the female joint member 8.

Fifth Embodiment

Figure 9:
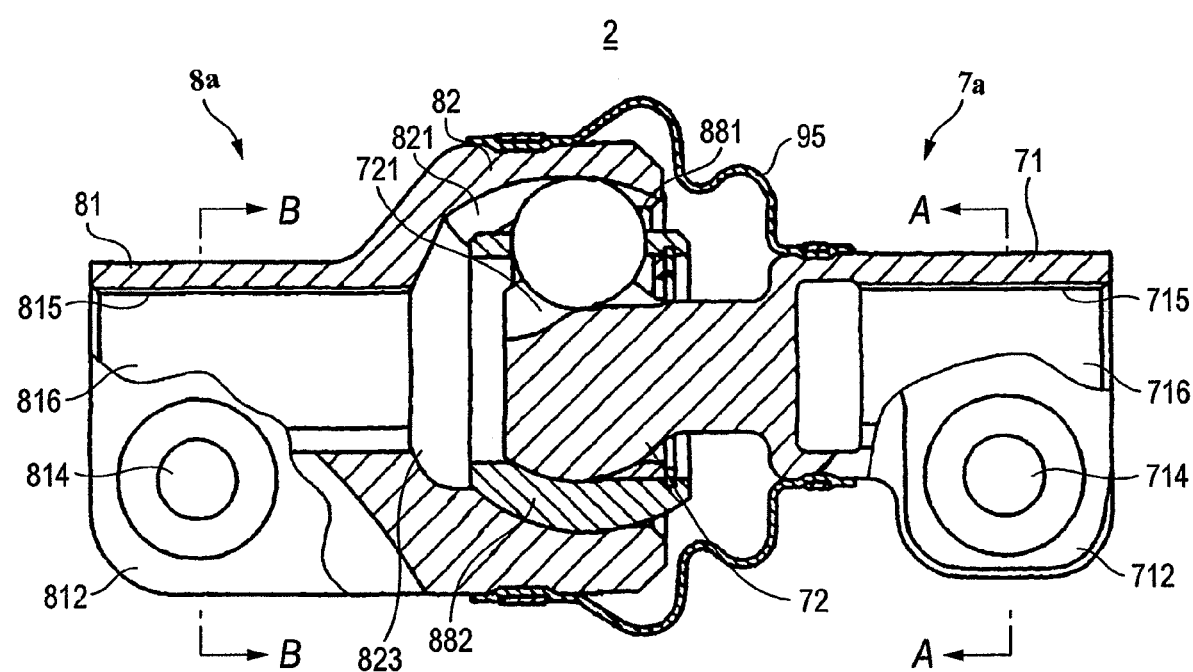
FIG. 9 is a front sectional view of the constant velocity ball universal joint 2 according to a fifth embodiment.
Figure 10:
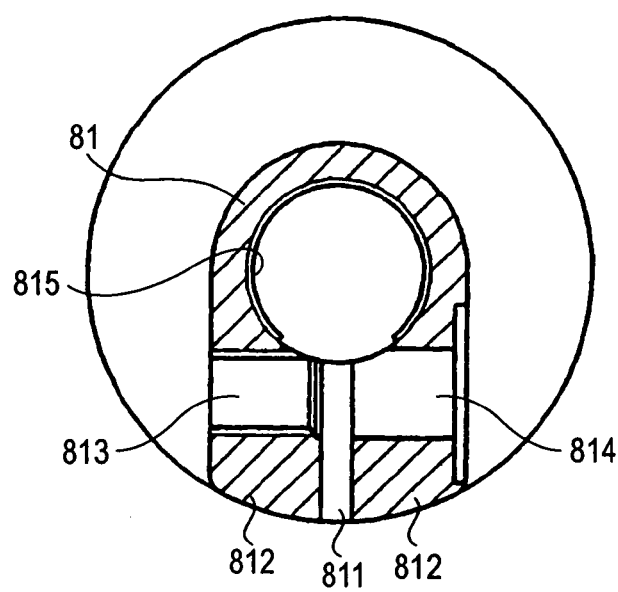
FIG. 10(A) is a sectional view taken along a line A-A of FIG. 9.
FIG. 10(B) is a sectional view taken along a line B-B of the same.
Figure 10:
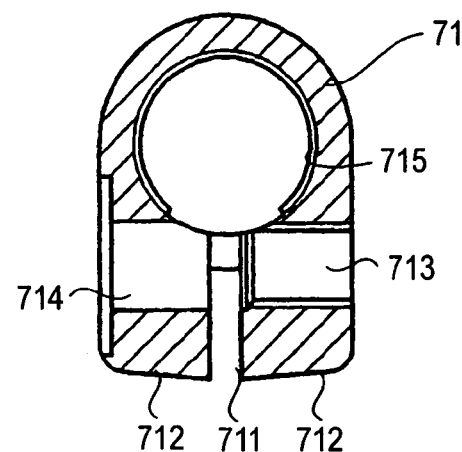

FIG. 9 is a front sectional view of the constant velocity ball universal joint 2 according to a fifth embodiment, FIG. 10(A) is a sectional view taken along a line A-A of FIG. 9, and FIG. 10(B) is a sectional view taken along a line B-B of the same. The fifth embodiment is an example of making the male joint member 7a, the female joint member 8a by hot forging. Since the flange 812 on the side of the female joint member 8 is not provided with a constricted portion between the flange 812 and the inner spherical face joint portion 82, although a weight thereof is slightly increased, there is achieved an advantage that a structure thereof is simple and a total length thereof can be shortened. Other of the fifth embodiment is similar to that of the fourth embodiment and therefore, the explanation of the fourth embodiment is referred and a duplicated explanation thereof will be omitted.

Sixth Embodiment

Figure 11:
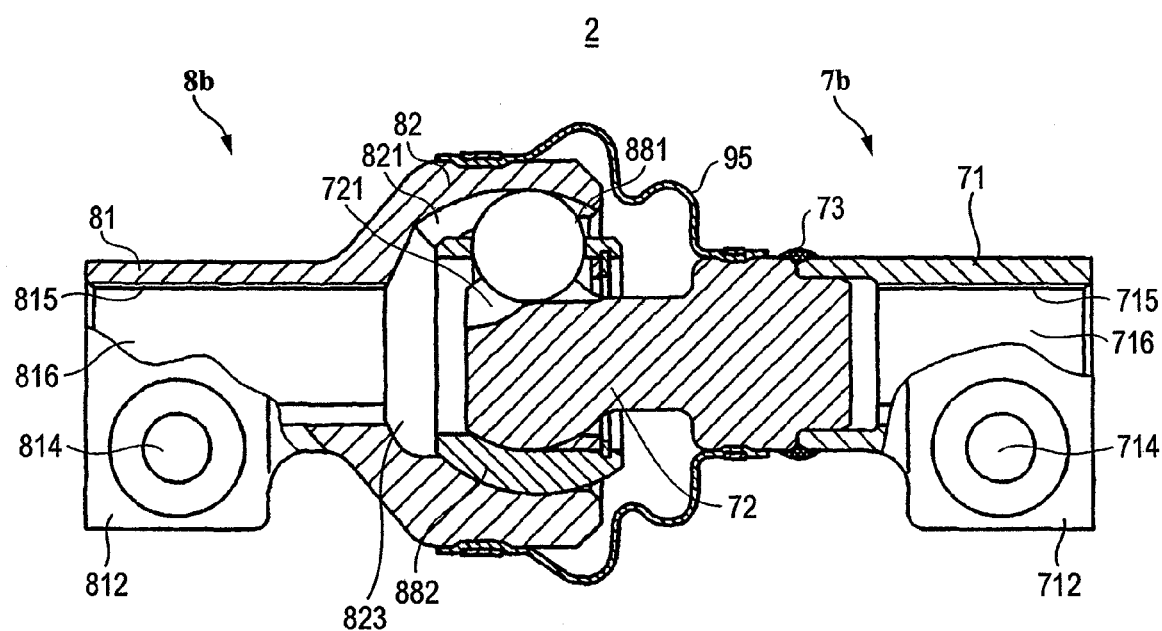
FIG. 11 is a front sectional view of the constant velocity ball universal joint 2 according to a sixth embodiment.

FIG. 11 is a front sectional view of the constant velocity ball universal joint 2 according to a sixth embodiment. According to the example, the male joint member 7b is constituted by two parts of the first connecting base portion 71 and the outer spherical face joint portion 72 to be fitted to each other and a fitting portion thereof is welded (welded portion 73). Other of the sixth embodiment is similar to those of the first and the second embodiments and therefore, the explanation of the first and the second embodiments will be and a duplicated explanation thereof will be omitted. When the total length of the male joint member 7b needs to be prolonged, the constant velocity ball universal joint 2 achieves an advantage of capable of being fabricated at comparatively low cost. The first connecting base portion 71 is produced by cold forging, warm forging, or hot forging and machining.

Seventh Embodiment

Figure 12:
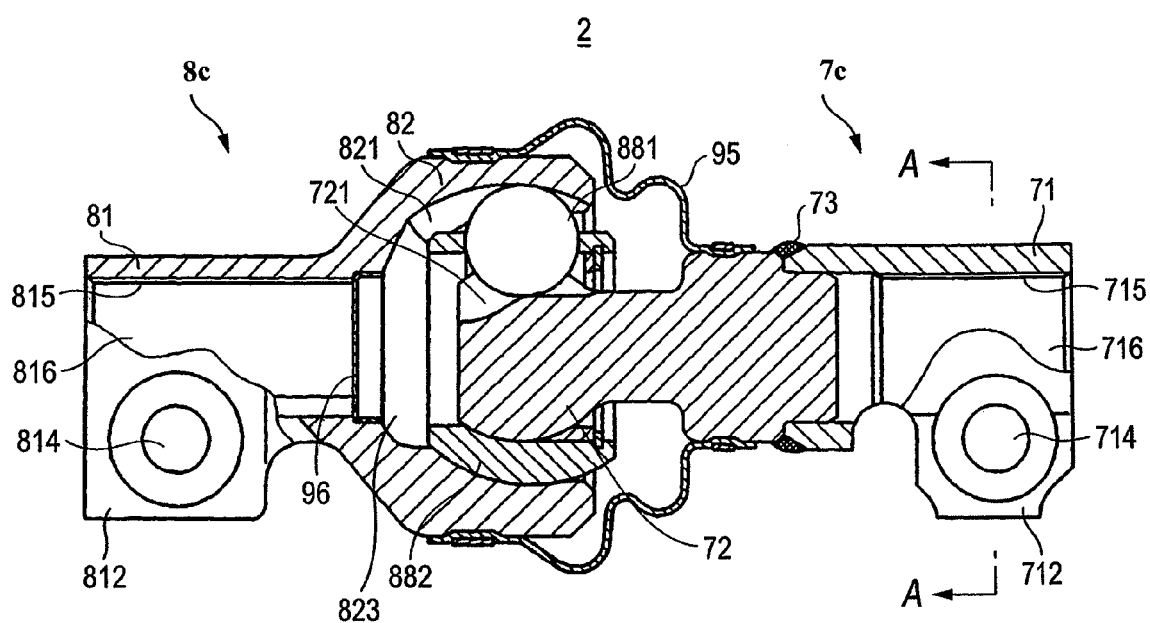
FIG. 12 is a front sectional view of the constant velocity ball universal joint 2 according to a seventh embodiment.
Figure 13:
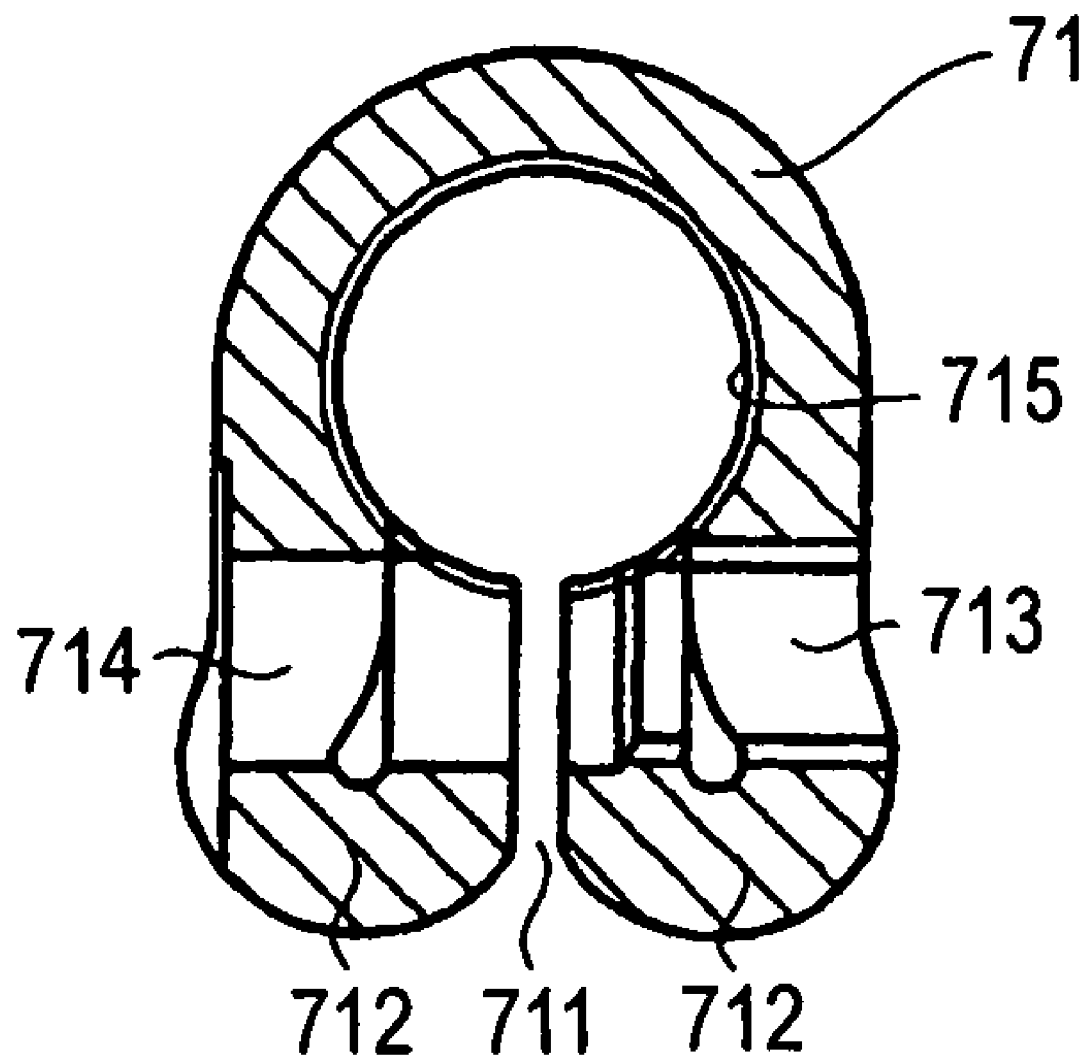
FIG. 13 is a sectional view taken along a line A-A of FIG. 12.

FIG. 12 is a front sectional view of the constant velocity ball universal joint 2 according to a seventh embodiment, and FIG. 13 is a sectional view taken along a line A-A of FIG. 12. Similar to the sixth embodiment, according to the embodiment, the male joint member 7c is constituted by two parts of the first connecting base portion 71 and the outer spherical face joint portion 72 to be fitted to each other, and the fitting portion is welded. The first connecting base portion 71 is fabricated by a plate member and portions of the respective flanges 712 are folded back. Since the spherical space 823 is continuous to the cylindrical hole 816, there is a concern that dust and dirt invading from the slit 811 reaches inside of the spherical space 823 and therefore, the dust preventing cap 96 partitioning the cylindrical hole 816 and the spherical space 823 is provided. The dust preventing cap 96 also prevents grease at inside of the spherical space 823 from flowing out. The dust preventing cap 96 can be adopted not only for the embodiment but also other embodiments in which the cylindrical hole 816 and the spherical space 823 are continuous to form the through hole. Other of the seventh embodiment is similar to those of the above-described embodiments and therefore, the explanation of the other embodiments will be referred and a duplicated explanation thereof will be omitted.

Eighth embodiment

Figure 14:
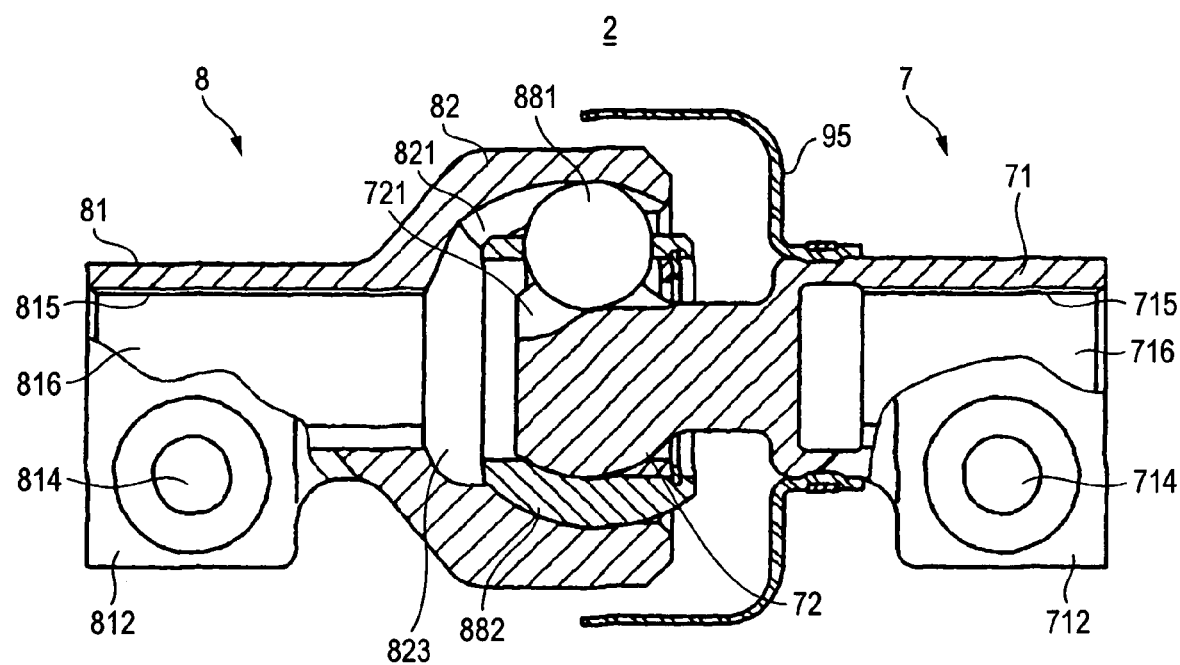
FIG. 14 is a front sectional view of the constant velocity ball universal joint 2 according to an eighth embodiment.

FIG. 14 is a front sectional view of the constant velocity ball universal joint 2 according to an eighth embodiment. According to the embodiment, a portion of the dust preventing boot 95 is opened. In the case of the constant velocity ball universal joint 2 used in a vehicular compartment, a boot having such a structure is frequently sufficient. When the intersecting angle is provided, the dust preventing boot 95 is only brought into slightly contact with an outer side of the inner spherical face joint portion 82 or is not brought into contact therewith at all and therefore, there is achieves an advantage that a load torque (fold-bend torque) having a magnitude as in completely enclosing the constant velocity ball universal joint 2 is not generated. Further, the dust preventing boot 95 can also be provided to the side of the inner spherical face joint portion 82. Other of the eighth embodiment is similar to those of the above-described embodiments and therefore, the explanation of the other embodiments will be referred and the duplicating explanation thereof will be omitted.

INDUSTRIAL APPLICABILITY

According to the joint apparatus of the present invention, it is not necessary to carry out complicated phase matching in integrating operation and promote accuracy therefor and therefore, not only the cost can be reduced but also the feeling of operating the steering wheel is not deteriorated by a variation in the torque since large variation in the torque as in using only the cross universal joint is not generated because the constant velocity ball universal joint is used for the universal joint while using the rubber coupling. Further, vibration from the vehicle body side is absorbed by the rubber coupling and therefore, the operational feeling can be maintained excellent. Further, even when a large torque is applied by steering wheel operation at emergency, the torque can be transmitted by operating the stopper and therefore, safety of the steering apparatus can be promoted.

According to the constant velocity ball universal joint of the present invention, the constant velocity ball universal joint can be coupled to a counterpart of coupling without separately preparing a coupling even when the counterpart of coupling is a shaft (male shaft), further, the joint portion on the side of the female joint member and the space of the inner spherical face joint portion constitute the through hole and therefore, there is achieved an effect of capable of comparatively easily grinding the ball guide groove. Further, thereby, there is achieved an effect of capable of providing the constant velocity ball universal joint at inexpensive cost.

The invention claimed is:

1. A vehicular steering apparatus comprising:
   a male joint member including a first connecting base portion in a cylindrical shape and an outer spherical face joint portion provided on an axis line of the first connecting base portion and having a spherical outer face;
   a female joint member including a second connecting base portion in a cylindrical shape which is adapted to connect with the male shaft and an inner spherical face joint portion provided on an axis line of the second connecting base portion and having a spherical space to which the spherical outer face is fitted;
   an outer ball guide groove formed at the spherical outer face of the outer spherical face joint portion;
   an inner ball guide groove formed at an inner face of the spherical space of the inner spherical face joint portion;
   a torque transmitting ball guided by the outer ball guide groove and the inner ball guide groove; and
   a ball retainer for retaining the torque transmitting ball,
   wherein each of the first connecting base portion and the second connecting base portion includes at least one slit reaching an inner portion of a cylinder of each thereof;
   wherein a pair of flanges for fastening are respectively formed on both sides of the slit of each of the first connecting base portion and the second connecting base portion,
   wherein each pair of the flange is formed coaxially with fastening holes,
   wherein female serrations are formed at both of an inner face of the cylinder of each of the first connecting base portion and the second connecting base portion, and
   wherein an interval between a cylindrical hole of the second connecting base portion and the inner spherical face joint portion is formed with a through hole penetrating coaxially, through which the male shaft is adapted to penetrate at a time of assembling.

2. The vehicular steering apparatus according to claim 1, wherein an interval between the male joint member and the female joint member is provided with a dust preventing boot in a cylindrical shape having a flexible fold for preventing dust and dirt from invading inside of the spherical space.

* * * * *